US006751567B2

(12) United States Patent
Farmer et al.

(10) Patent No.: US 6,751,567 B2
(45) Date of Patent: Jun. 15, 2004

(54) ELECTRONIC THROTTLE PLATE INDEX POSITION DETERMINATION FOR IMPROVED AIRFLOW CORRELATION OVER VARIOUS TEMPERATURE CONDITIONS

(75) Inventors: David George Farmer, Plymouth, MI (US); David Oshinsky, Trenton, MI (US); Edward Badillo, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 36 days.

(21) Appl. No.: 09/995,076

(22) Filed: Nov. 26, 2001

(65) Prior Publication Data

US 2003/0101014 A1 May 29, 2003

(51) Int. Cl.7 .......................... G01K 15/00; G06F 19/00
(52) U.S. Cl. .......................................... 702/99; 702/94
(58) Field of Search .............................. 702/94, 95, 96, 702/99, 116; 123/352, 492–494, 568.27; 290/40 B, 1 A, 51

(56) References Cited

U.S. PATENT DOCUMENTS

| | | | | |
|---|---|---|---|---|
| 4,722,313 A | | 2/1988 | Kohler et al. | 123/494 |
| 4,951,206 A | | 8/1990 | Kyohzuka | 364/424.1 |
| 5,157,956 A | | 10/1992 | Isaji et al. | 73/1 D |
| 5,353,768 A | * | 10/1994 | Messih et al. | 123/492 |
| 5,473,936 A | | 12/1995 | Sasakura et al. | 73/118.1 |
| 5,546,910 A | * | 8/1996 | Messih et al. | 123/492 |
| 5,606,948 A | * | 3/1997 | Gonnering | 123/352 |
| 5,970,961 A | * | 10/1999 | Kotwicki et al. | 123/568.27 |

* cited by examiner

*Primary Examiner*—Bryan Bui

(57) ABSTRACT

A system (12) and method for determining the closed position of a throttle plate 52 of an internal combustion engine (10) are provided. The system (12) includes a throttle sensor (56), a temperature sensor (70 or 86), and an electronic control unit (ECU) (72). The throttle sensor (56) generates a signal indicative of the position of the throttle plate (52). The temperature sensor (70 or 86) generates a signal indicative of the temperature of a throttle body (50) of the engine (10). The ECU (72) is configured to select one of a first closed position value indicated by throttle sensor (56) signal and a second closed position value retrieved from a memory (94) responsive to the measured temperature. The inventive system is able to minimize inaccuracies in throttle plate position detection by eliminating errors resulting from a change in geometry between the throttle plate (52) and the throttle body (50) of the engine during relatively high temperatures.

22 Claims, 2 Drawing Sheets

ELECTRONIC THROTTLE PLATE INDEX POSITION DETERMINATION FOR IMPROVED AIRFLOW CORRELATION OVER VARIOUS TEMPERATURE CONDITIONS

FIELD OF THE INVENTION

This invention relates to systems and methods for control of fuel delivery to vehicle engines and, in particular, to a system and method for determining the position of a throttle plate of the engine.

BACKGROUND OF THE INVENTION

A conventional vehicle having a fuel-injected internal combustion engine includes a system for controlling the amount of fuel injected into each cylinder of the engine during a combustion event. The system also frequently includes an electronic throttle control to regulate the amount of air flowing through the engine's throttle body to the intake manifold and cylinders. Controlling the amount of fuel and air input to the engine cylinders is critical in obtaining an optimal air-fuel ratio in the cylinders and thereby reducing emissions of hydrocarbons (HC), carbon monoxide (CO) and nitrous oxides ($NO_x$).

The electronic throttle control determines the amount of air flowing through the throttle body by determining the angular position of a throttle plate disposed within the throttle body. The position of the throttle plate is determined relative to a closed position of the throttle plate which is used as an index. The closed position of the throttle plate is normally sensed during initial key-on before or at the beginning of ignition of the engine. At relatively high temperatures, the physical geometry between the throttle plate and the throttle body is altered. As a result, the closed position of the throttle plate assumes a different value based on the relatively high temperature of the throttle body—a value that is often greater that the values determined for a cooler throttle body.

The engine control system is designed to adaptively learn, over a period of time, corrective terms for predictive idle airflow relative to the closed throttle position. These terms are stored in memory and mature over a relatively long driving period. An error in the corrective terms will therefore result if aberrations in the closed throttle position—resulting from throttle body temperatures outside of a constrained range—are not accounted for. For example, an engine control system may learn corrective terms for predictive idle airflow responsive to a closed throttle position determined on a throttle body having a relatively high temperature. If the vehicle is subsequently re-started at a normal temperature, the airflow prediction will be incorrect and will result in the engine speed deviating from the desired engine speed during startup. In some instances, the inconsistent engine speed can even result in a stall.

There is thus a need for a system and method for determining the closed position for a throttle plate in an internal combustion engine that will minimize and/or eliminate one or more of the above-identified deficiencies.

SUMMARY OF THE INVENTION

The present invention provides a system and a method for determining the closed position for a throttle plate in an internal combustion engine. A method in accordance with the present invention includes the step of determining a first closed position value. The first closed position value may, for example, be determined using a conventional throttle position sensor. The inventive method also includes the step of estimating a temperature of a throttle body of the internal combustion engine. This temperature estimate may, for example, be made using an air temperature sensor or engine coolant temperature sensor or a weighted combination of the two. Finally, the inventive method includes the step of selecting one value from among the first closed position value and a second closed position value that is stored in a memory. The selection is made responsive to the temperature of charged air and the selected value corresponds to the closed position of the throttle plate.

A system in accordance with the present invention includes a throttle plate position sensor that generates a position signal indicative of a position of the throttle plate and a temperature sensor that generates a temperature signal indicative of a temperature of the throttle body of the internal combustion engine. The system further includes an electronic control unit that is configured, or encoded, to determine a first closed position value responsive to the position signal and to select one value from among the first closed position value and a second closed position value stored in a memory in response to the temperature signal. The selected value again corresponds to the closed position of the throttle plate.

The present invention represents an improvement as compared to conventional systems and methods for determining the closed position of a throttle plate. In particular, the inventive system and method enable corrective terms for predictive idle airflow to be learned without reference to aberrations in the sensed closed throttle position that result from relatively high throttle body temperatures. As a result, the engine control system more accurately predicts airflow to the engine cylinders and maintains consistent speed upon engine startup.

These and other advantages of this invention will become apparent to one skilled in the art from the following detailed description and the accompanying drawings illustrating features of this invention by way of example.

DETAILED DESCRIPTION OF THE PREFERRED EMBODIMENT

Figure 1:
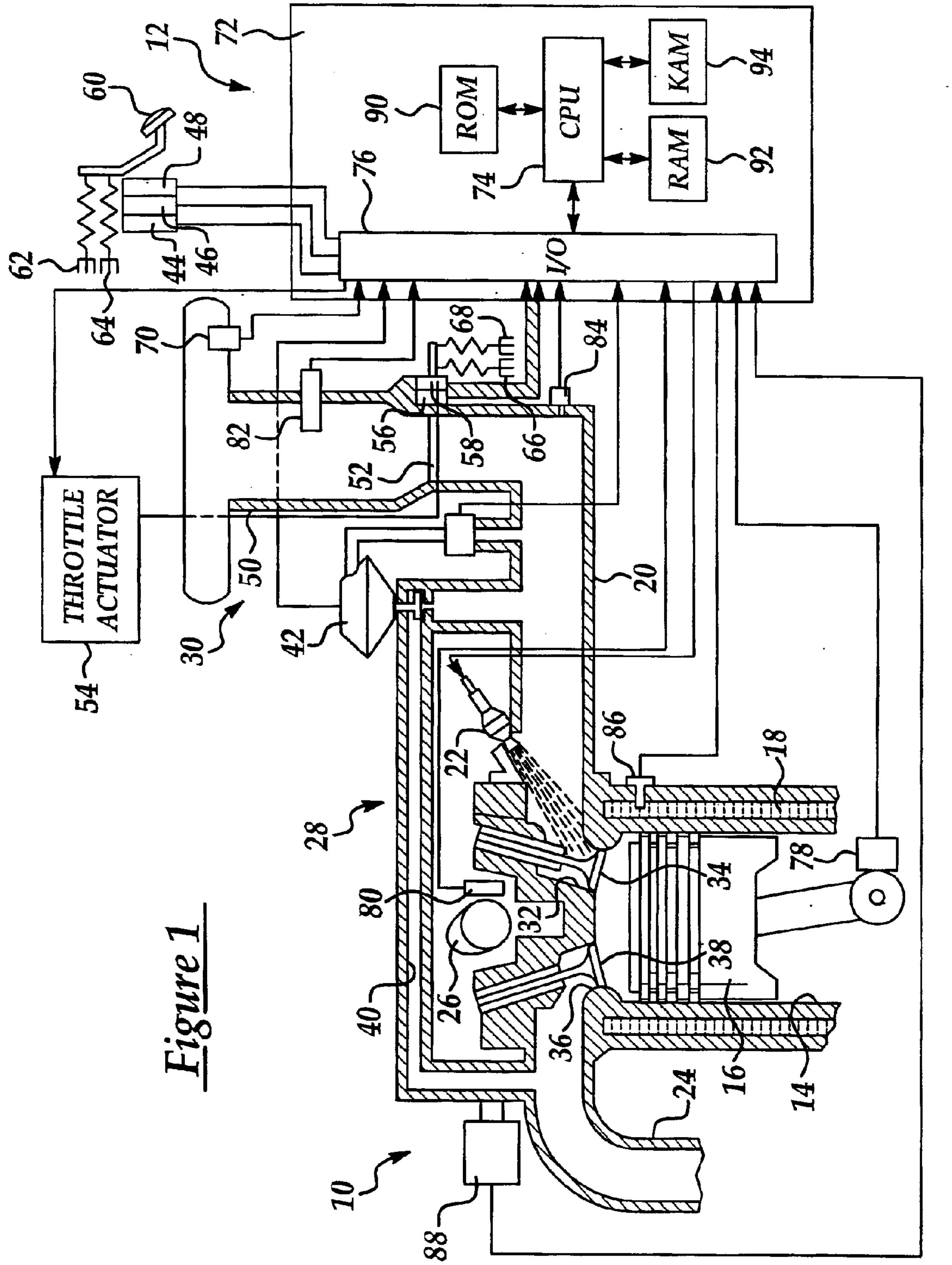
FIG. 1 is a schematic diagram illustrating an internal combustion engine incorporating a system for determining a closed position of a throttle plate in accordance with the present invention.

Referring now to the drawings wherein like reference numerals are used to identify identical components in the various views, FIG. 1 illustrates an internal combustion engine 10 and a system 12 in accordance with the present invention for determining a closed position of a throttle plate in engine 10. The position of the throttle plate is used to determine the amount of airflow into engine 10 in order to maintain a desired air/fuel ratio and control emissions of hydrocarbons, carbon monoxide and nitrous oxides.

Engine 10 is designed for use in a motor vehicle. It should be understood, however, that engine 10 may be used in a wide variety of applications. Engine 10 provides motive energy to a motor vehicle or other device and is conventional in the art. Engine 10 may define a plurality of combustion chambers or cylinders 14 and may also include a plurality of pistons 16, coolant passages 18, an intake manifold 20, fuel injectors 22, an exhaust manifold 24, a camshaft 26, an engine gas recirculation (EGR) system 28, and an electronically controlled throttle assembly 30.

Cylinders 14 provide a space for combustion of an air/fuel mixture to occur and are conventional in the art. In the illustrated embodiment, only one cylinder 14 is shown. It will be understood, however, that engine 10 may define a plurality of cylinders 14 and that the number of cylinders 14 may be varied without departing from the spirit of the present invention. A spark plug (not shown) may be disposed within each cylinder 14 to ignite the air/fuel mixture in the cylinder 14.

Pistons 16 are coupled to a crankshaft (not shown) and drive the crankshaft responsive to an expansion force of the air-fuel mixture in cylinders 14 during combustion. Pistons 16 are conventional in the art and a piston 16 may be disposed in each cylinder 14.

Coolant passages 18 provide a means for routing a heat transfer medium, such as a conventional engine coolant, through engine 10 to transfer heat from cylinders 14 to a location external to engine 10. Passages 18 are conventional in the art.

Intake manifold 20 provides a means for delivering charged air to cylinders 14. Manifold 20 is conventional in the art. An inlet port 32 is disposed between manifold 20 and each cylinder 14. An intake valve 34 opens and closes each port 32 to control the delivery of air and fuel to the respective cylinder 14.

Fuel injectors 22 are provided to deliver fuel in controlled amounts to cylinders 14 and are conventional in the art. Although only one fuel injector 22 is shown in the illustrated embodiment, it will again be understood that engine 10 will include additional fuel injectors for delivering fuel to other cylinders 14 in engine 10.

Exhaust manifold 24 is provided to vent exhaust gases from cylinders 14 after each combustion event. Manifold 24 is also conventional in the art and may deliver exhaust gases to a catalytic converter (not shown). An exhaust port 36 is disposed between manifold 24 and each cylinder 14. An exhaust valve 38 opens and closes each port 36 to control the venting of exhaust gases from the respective cylinder 14.

Camshaft 26 is provided to control the opening and closing of intake valves 34 and exhaust valves 38 in each of cylinders 14. Camshaft 26 is conventional in the art and may be controlled by an actuator (not shown) responsive to control signals generated by the vehicle's electronic control unit (ECU). It will be understood by those of skill in the art that separate camshafts 26 may be used to control the opening and closing of intake valves 34 and exhaust valves 38, respectively.

EGR system 28 is provided to return a portion of the exhaust gases to cylinders 14 in order to reduce emissions of combustion by-products. EGR system 26 includes a passage 40 that extends from exhaust manifold 24 to intake manifold 20 and an EGR valve 42 that may be disposed within passage 40 to control the delivery of recirculated exhaust gases to intake manifold 22.

Throttle assembly 30 controls the amount of air delivered to intake manifold 22 and cylinders 14. Assembly 30 is conventional in the art and may include one or more pedal position sensors 44, 46, 48, a throttle body 50, a throttle plate 52, an actuator 54, and one ore more throttle position sensors 56, 58.

Pedal position sensors 44, 46, 48 are provided to detect the position of the vehicle accelerator pedal 60. Sensors 44, 46, 48 are conventional in the art may comprise potentiometers. Sensors 44, 46, 48 generator pedal position signals that may be input to the vehicle's electronic control unit. The signals are indicative of the position of pedal 60. As will be understood by those in the art, pedal 60 may be urged to a normal position by one or more springs 62, 64.

Throttle body 50 provides an inlet for air provided to engine 10. Throttle body 50 is conventional in the art and is generally cylindrical in shape.

Throttle plate 52 regulates the amount of airflow through throttle body 50 and to engine 10. Plate 52 is conventional in the art and may be supported on a shaft having an axis of rotation perpendicular to the cylindrical axis of body 50. Plate 52 may be urged to a normal position by one more return springs 66, 68.

Actuator 54 controls the position of throttle plate 52 and is conventional in the art. Actuator 54 may be responsive to one or more control signals generated by the vehicle's electronic control unit.

Sensors 56, 58 generate position signals indicative of the angular position of throttle plate 52 within body 50. Sensors 56, 58 are conventional in the art and may comprise potentiometers.

System 12 is provided to determine a closed position of throttle plate 52. System 12 may form part of a larger system for controlling the air/fuel ratio in cylinders 14. System 12 may include one or more of throttle position sensors 56, 58, a temperature sensor—such as air temperature sensor 70—and an electronic control unit (ECU) 72.

Air temperature sensor 70 is used to measure the temperature of charged air delivered to intake manifold 20 through throttle body 50—a temperature which may also be used as an estimate of the temperature of throttle body 50. Sensor 70 is conventional in the art and may be disposed proximate the inlet of throttle body 50. Sensor 70 generates a signal that is indicative of the air temperature and is input to ECU 58.

ECU 72 is provided to control engine 10. Unit 58 may comprise a programmable microprocessor or microcontroller or may comprise an application specific integrated circuit (ASIC). ECU 58 may include a central processing unit (CPU) 74 and an input/output (I/O) interface 76. Through interface 76, ECU 58 may receive a plurality of input signals including signals generated by sensors 56, 58, 70 and other sensors such as a profile ignition pickup (PIP) sensor 78, a cylinder identification (CID) sensor 80, a mass air flow (MAF) sensor 82, a manifold absolute pressure (MAP) sensor 84, an engine coolant temperature sensor 86 (which may also be used to estimate the temperature of throttle body 50), and a Heated Exhaust Gas Oxygen (HEGO) sensor 88. Also through interface 76, ECU 72 may generate a plurality of output signals including one or more signals used to control fuel injectors 22, camshaft 26, EGR valve 42, throttle actuator 54, and the spark plugs (not shown) in each cylinder 14. ECU 58 may also include one or more memories including, for example, Read Only Memory (ROM) 90, Random Access Memory (RAM) 92, and a Keep Alive Memory (KAM) 94 to retain information when the ignition key is turned off.

Figure 2:
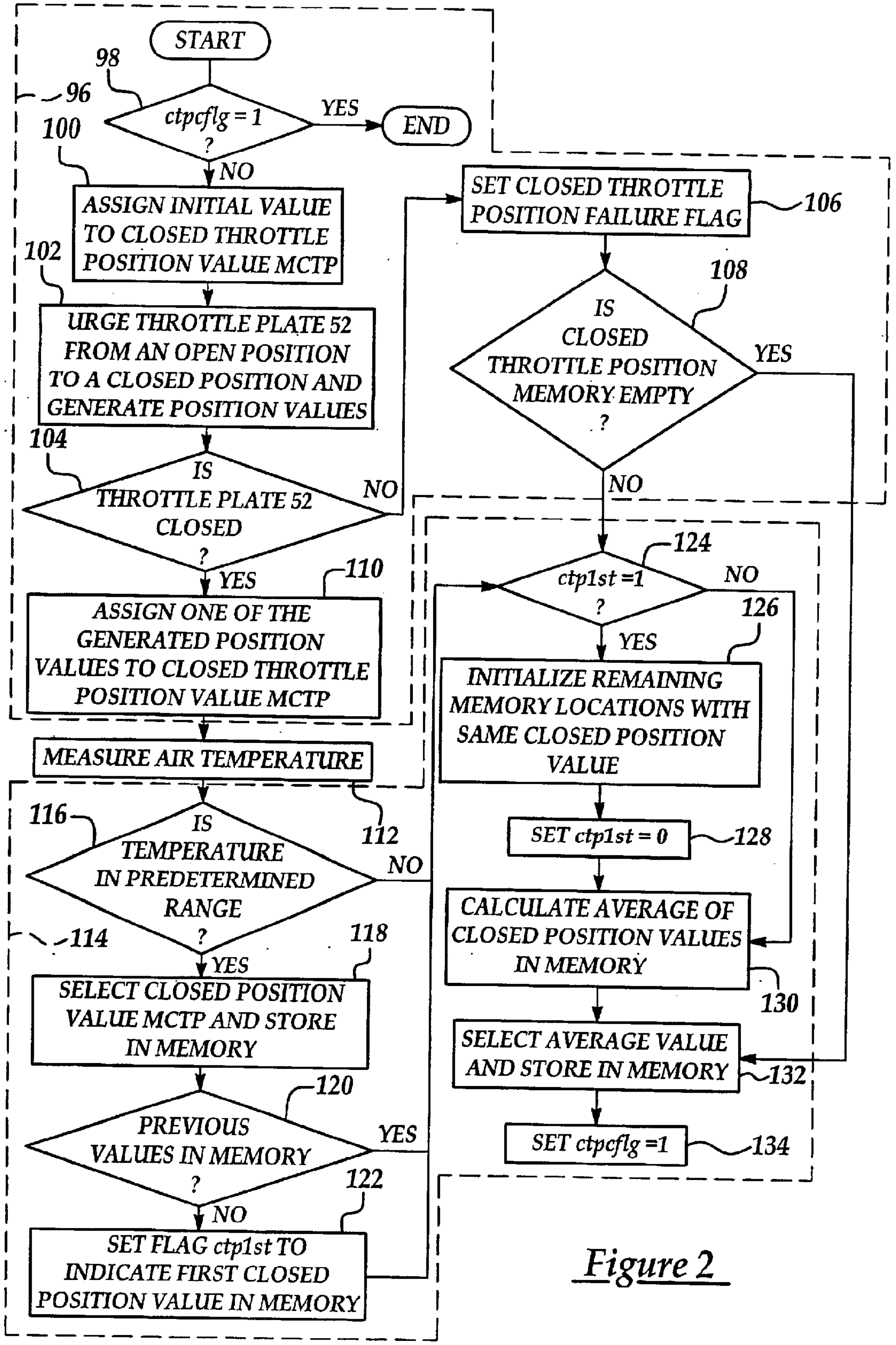
FIG. 2 is a flow chart diagram illustrating a method for determining a closed position of a throttle plate of an internal combustion engine in accordance with the present invention.

Referring now to FIG. 2, one embodiment of a method for determining the closed position of throttle plate 52 will be described. The method or algorithm may be implemented by system 12 wherein ECU 72 is configured to perform several steps of the method by programming instruction or code (i.e., software). The instructions may be encoded on a computer storage medium such as a conventional diskette or CD-ROM and may be copied into memory 90 of ECU 72 using conventional computing devices and methods.

A method in accordance with the present invention may begin with the step 96 of determining a closed position value MCTP for throttle plate 52. Step 96 may include several substeps. It should be understood, however, that FIG. 2 represents only one embodiment of the inventive method. Accordingly, the particular substeps illustrated are not intended to be limiting in nature. Step 96 may be implemented with substeps that are different in substance and number from those illustrated in FIG. 2.

Step 96 may begin with the substep 98 of determining whether the closed throttle position has been determined. This determination may be made with reference to a flag ctpcflg set in a memory, such as one of memories 90, 92, 94. If the flag indicates that the closed throttle position has been determined, the software routine ends. If the flag indicates that the closed throttle position has not been determined, the routine continues with substep 100.

In substep 100, an initialization value is assigned to the closed position value MCTP. The initialization value may correspond to the highest value at which sensors 66, 68 may read a closed position for throttle plate 52. The initialization value is based on manufacturing specifications for sensors 56, 58 and may be stored in a memory, such as one of memories 90, 92, 94. The closed position value MCTP may also be stored in one of memories 90, 92, 94 and the initialization value may be copied into the memory location for the closed position value MCTP.

Step 96 may continue with the substep 102 in which throttle plate 52 is urged from an open position to a closed position and a plurality of position values are generated responsive to the plurality of positions assumed by throttle plate 52 as it moves from the open position to the closed position. Referring to FIG. 1, ECU 72 may generate one or more control signals to actuator 54 to cause throttle plate 52 to move from an open position to the closed position. As plate 52 moves, sensors 56, 58 generate throttle position signals indicative of the position of plate 52. These position signals are input to ECU 72.

Referring again to FIG. 2, step 96 may continue with the substep 104 of determining whether throttle plate 52 failed to arrive at the closed position. In particular, ECU 72 may compare the closed position values for throttle plate 52 indicated by sensors 56, 58 to the initialization value. If none of the closed position values is lower than the initialization value, ECU 72 determines that throttle plate 52 did not close. If throttle plate 52 did not close, step 96 may continue with the substeps 106 of setting a closed throttle position failure flag. ECU 72 may set the closed throttle position failure flag in one of memories 90, 92, 94. Step 96 may further continue with the substep 108 of determining whether any previously obtained closed position values are stored in memory 94. This determination is done in an attempt to assign a value to the closed position value MCTP. If no values are stored in memory 94, MCTP retains the previously assigned initialization value. If previously obtained closed position values are stored in memory 94, a value is assigned to MCTP using the stored values in a manner described in greater detail hereinbelow (see substeps 124–134).

If throttle plate 52 successfully reached a closed position, step 96 continues with the substep 110 of recording one of the plurality of position values obtained during movement of plate 52 from an open position to the closed position as the closed position value MCTP. The recorded position value is chosen responsive to a predetermined condition. In one embodiment of the invention, the predetermined condition is that the recorded value be the lowest position value obtained from sensors 56, 58.

The inventive method may continue with the step 112 of estimating a temperature of throttle body 50. Referring to FIG. 1, this determination may be made using, for example, air temperature sensor 70, engine coolant temperature 86, or a combination of the two. Sensors 70, 86 generate signals indicative of the temperatures of charged air entering engine 10 and the engine coolant. These signals are input to ECU 72 which may be configured to take either one of the measured temperatures or a weighted combination of the two, as an estimate of the temperature of throttle body 50.

Referring again to FIG. 2, the inventive method may finally include the step 114 of selecting a value from among the previously obtained closed position value MCTP and a second closed position value stored in a memory, such as memories 90, 92, 94, responsive to the temperature of the charged air entering engine 10. The selected value corresponds to the closed position of throttle plate 52. Step 114 may include several substeps. It should again be understood, however, that FIG. 2 represents only one embodiment of the inventive method. Accordingly, the particular substeps illustrated are not intended to be limiting in nature. Step 114 may be implemented with substeps that are different in substance and number from those illustrated in FIG. 2.

Step 114 may begin with the substep 116 of determining whether the measured air temperature is within a predetermined temperature range. The predetermined temperature range may comprise temperatures less than a predetermined value at which the physical geometry between throttle body 50 and throttle plate 52 is altered. ECU 72 may perform this comparison in a conventional manner.

If the measured temperature is within the predetermined temperature range (e.g., less than a predetermined value), step 114 continues with the substep 118 in which ECU 72 selects the measured closed position value MCTP as the value corresponding to the closed position of throttle plate 52 and stores the value in memory 94. Step 114 may further proceed with a substep 120 in which ECU 72 determines whether memory 94 includes any previously obtained closed position values. If not, step 114 continues with the substep 122 in which a flag ctp1st is set in a memory such as memory 94 to indicate that the selected value is the first closed position value recorded in memory 94.

If the measured temperature is outside of the predetermined range (e.g., greater than a predetermined value), the physical geometry of throttle body 50 relative to throttle plate 52 may be altered and the measured closed position value MCTP may not be an accurate value. Accordingly, another closed position value is selected in accordance with substeps 124–134. As illustrated in FIG. 2, substeps 124–134 take place in one embodiment of the invention even if the measured temperature is within the predetermined range. Substeps 124–134 are designed to provide an average of the most recent closed position values obtained during previous startups of the vehicle. When the measured temperature is outside of the predetermined range, this calculation takes place without reference to the measured closed position value MCTP. When the measured temperature is within the predetermined range, the calculation takes place with reference to the measured closed position value MCTP (which will be one of the averaged values taken from memory 94). It should again be understood, however, that the illustrated embodiment is exemplary only and that step 114 could end with the selection of the measured closed position value MCTP in substep 118 when the measured temperature is within the predetermined range.

In substep 124, ECU 72 checks the flag ctp1st. If the flag ctp1st indicates that only one closed position value is in memory 94, step 114 continues with the substeps 126, 128 in which ECU 72 initializes a plurality of additional memory locations in memory 94 with the same value and changes the state of flag ctp1st to indicate that multiple closed position values are now stored in memory 94. If the flag ctp1st indicates that multiple closed position values are stored in memory 94, substeps 126, 128 are not executed. There are preferably a predetermined number of closed position values stored in memory 94.

Step 114 may continue with substep 130 in which ECU 72 calculates the average of the closed position values in memory 94. In accordance with substep 132, ECU 72 then selects this average value as the value corresponding to the closed position of throttle plate 52. Finally, step 114 may conclude with the substep 134 in which ECU 72 sets the closed throttle position flag ctpcflg to indicate that the closed throttle position has been determined.

A system and method in accordance with the present invention for determining a closed position for a throttle plate in an internal combustion engine represent a significant improvement as compared to conventional systems and methods. The inventive system and method are able to account for temperature changes that alter the physical geometry of the throttle plate relative to the throttle body. As a result, corrective terms for predictive airflow are learned without reference to aberrations in the closed throttle plate position resulting from relatively high throttle body temperatures and the engine control system more accurately predicts airflow to the engine cylinders and maintains consistent speed upon engine startup.

We claim:

1. A method for determining a closed position of a throttle plate in an internal combustion engine, comprising the steps of:

determining a first closed position value;

estimating a temperature of a throttle body of said internal combustion engine; and, selecting one value from said first closed position value and a second closed position value stored in a memory responsive to said temperature, said one value corresponding to said closed position of said throttle plate.

2. The method of claim 1, further comprising the step of storing said one value in said memory.

3. The method of claim 1 wherein said determining step includes the substeps of:

urging said throttle plate from an open position to said closed position;

generating a plurality of position values responsive to a plurality of positions of said throttle plate as said throttle plate moves from said open position to said closed position; and, recording one of said plurality of position values as said first closed position value responsive to a predetermined condition.

4. The method of claim 3 further comprising the substep of determining whether said throttle plate failed to arrive at said closed position.

5. The method of claim 1 wherein said selecting step includes the substep of determining whether said temperature is within a predetermined temperature range.

6. The method of claim 1 wherein said selecting step includes the substep of calculating an average of a plurality of previously obtained closed position values stored in said memory.

7. The method of claim 1 wherein said second closed position value is selected as said one value when said temperature is greater than a predetermined temperature.

8. A system for determining a closed position of a throttle plate in an internal combustion engine, comprising:

a throttle plate position sensor that generates a position signal indicative of a position of said throttle plate;

a temperature sensor that generates a temperature signal indicative of a temperature of a throttle body of said internal combustion engine; and, an electronic control unit configured to determine a first closed position value responsive to said position signal and to select one value from said first closed position value and a second closed position value stored in a memory responsive to said temperature signal, said one value corresponding to said closed position of said throttle plate.

9. The system of claim 8, further wherein said electronic control unit is further configured to store said one value in said memory.

10. The system of claim 8 wherein said electronic control unit is further configured, in determining said first closed position value, to generate a throttle control signal that urges said throttle plate from an open position to said closed position, to generate a plurality of position values responsive to a plurality of said position signals generated by said throttle plate position sensor as said throttle plate moves from said open position to said closed position; and to record one of said plurality of position values as said first closed position value responsive to a predetermined condition.

11. The system of claim 10 wherein said electronic control unit is further configured, in determining said first closed position value, to determine whether said throttle plate failed to arrive at said closed position.

12. The system of claim 8 wherein said electronic control unit is further configured, in selecting said one value, to determine whether said temperature is within a predetermined temperature range.

13. The system of claim 8 wherein said electronic control unit is further configured in selecting said one value, to calculate an average of a plurality of previously obtained closed position values stored in said memory.

14. The system of claim 8 wherein said electronic control unit is further configured, in selecting said one value, to select said second closed position as said one value when said temperature is greater than a predetermined temperature.

15. An article of manufacture, comprising:

a computer storage medium having a computer program encoded therein for determining a closed position of a throttle plate in an internal combustion engine, said computer program including:

code for determining a first closed position value;

code for estimating a temperature of a throttle body of said internal combustion engine; and, code for selecting one value from said, first closed position value and a second closed position value stored in a memory responsive to said temperature, said one value corresponding to said closed position of said throttle plate.

16. The article of manufacture of claim 15 further comprising code for storing said one value in said memory.

17. The article of manufacture of claim 15 wherein said code for determining said first closed position value includes:

code for generating a throttle control signal to urge said throttle plate from an open position to said closed position;

code for generating a plurality of position values responsive to a plurality of position signals generated by a throttle plate position sensor as said throttle plate moves from said open position to said closed position; and code for recording one of said plurality of position values as said first closed position value responsive to a predetermined condition.

18. The article of manufacture of claim 17 wherein said code for determining said first closed position value further includes code for determining whether said throttle plate failed to arrive at said closed position.

19. The article of manufacture of claim 15 wherein said code for selecting said one value further includes code for determining whether said temperature is within a predetermined temperature range.

20. The article of manufacture of claim 15 wherein said code for selecting said one value further includes code for calculating an average of a plurality of previously obtained closed position values stored in said memory.

21. The article of manufacture of claim 15 wherein said code for selecting said one value further includes code for selecting said second closed position as said one value when said temperature is greater than a predetermined temperature.

22. A method for determining a closed position of a throttle plate in an engine, comprising:

determining a temperature of said engine; and, selecting one of first and second throttle plate closed position values stored in a memory, said selection being based on said temperature, said one value corresponding to said closed position of said throttle plate.

* * * * *